No. 878,654. PATENTED FEB. 11, 1908.
W. MAUSS.
CHUCK.
APPLICATION FILED AUG. 9, 1907.
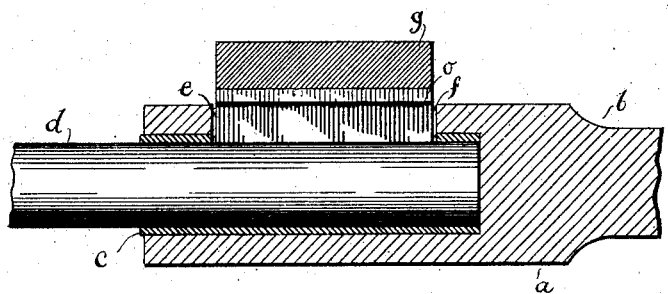
Fig. I.
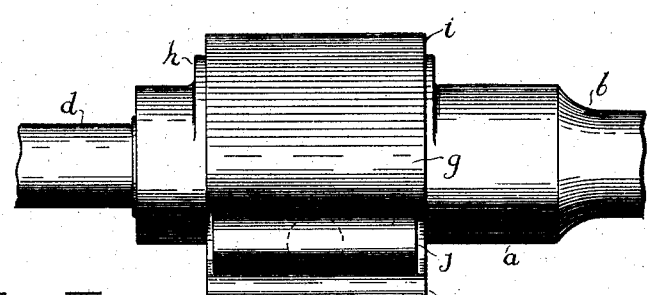
Fig. II.
Fig. III.
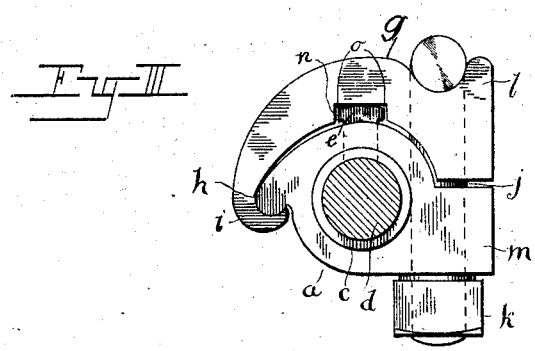
Witnesses:
C. H. Crawford
E. H. Singer.
Inventor:-
Wilhelm Mauss
by B. Singer
Attorney

UNITED STATES PATENT OFFICE.

WILHELM MAUSS, OF BRAKPAN, TRANSVAAL.

CHUCK.

No. 878,654.  Specification of Letters Patent.  Patented Feb. 11, 1908.

Application filed August 9, 1907. Serial No. 387,881.

*To all whom it may concern:*

Be it known that I, WILHELM MAUSS, a British subject, residing at The Rand Central Electric Works, Brakpan, in the Colony of the Transvaal, have invented certain new and useful Improvements in Chucks, of which the following is a specification.

This invention relates to chucks, the object being to provide a chuck, adapted more particularly for securing the drill in a rock-drilling machine, which is readily and accurately adjustable to secure or release the drill, which is more durable than the usual "U bolt" chuck, and the few wearing parts of which are readily renewable.

The invention is illustrated in the accompanying drawing in which

Figure I is a longitudinal section, Fig. II a plan, and Fig. III a front end view of a rock drill chuck.

Therein the body of the chuck is represented by letter $a$, $b$ indicates the piston rod to which it is attached, and $c$ a separate cylindrical bushing by which the internal surface of the chuck is made renewable in the usual manner.

$d$ indicates the drill shank inserted into the chuck. The drill is retained in the chuck by inward pressure of the pad $e$, which passes through a radial slot $f$ in the chuck body.

$g$ represents a yoke piece which is pivotally engaged with the body at one side, and, extending across the same, makes contact with the pad $e$. The upper surface of the pad is curved slightly as shown, to overcome any tendency of the yoke to cant the pad. The requisite pivotal engagement of the parts may be arranged in a simple and effective manner by forming a partly cylindrical lug $h$ upon the side of the body and turning in the edge $i$ of the yoke $g$ to engage therewith.

Means are provided for forcing the yoke towards the body and thereby pressing the pad upon the drill; said means as illustrated consisting of the T-headed bolt $j$ and nut $k$ by which the lugs $l$ and $m$, formed respectively upon the free end of the yoke and upon the chuck body, may be drawn together. The head of the bolt is made cylindrical as shown and the holes in the lugs are of such size as to give the bolt lateral freedom; whereby the bolt is permitted to adjust itself to varying positions of the yoke and bending of it is obviated. The pad is in this instance formed separately from the yoke, so that it may be readily renewed when worn; being sunk into a recess $n$ formed in the yoke and having shoulders $o$ to prevent its dropping too far into the head: endwise movement being prevented by the closed ends of the slot $f$. It is however to be understood that the pad may be made integral with the yoke, if considered desirable; while the yoke may be arranged longitudinally of the body instead of transversely as illustrated.

It will be seen that in the chuck described there is only one nut to be manipulated in tightening or loosening the drill and that, being straight, the shank of the bolt is not liable to the bending stresses which occur at the curve of the U bolt of the common form of chuck; moreover the injurious stresses and canting of the drill set up by unequal tightening of the two nuts of the U bolt, are avoided.

I claim as my invention:—

1. A chuck comprising in combination, a chuck-body provided with tool socket and an opening extending from the periphery of said body to said socket, said body having on one side a laterally disposed lug provided with a rounded engaging portion and on the other side a flat lug, a tool seated in said socket, a yoke having a lip portion overlapping said rounded engaging portion and being of complemental formation with respect thereto and also provided with a concave bolt head seat extending throughout its length and apertured to receive the shank of a bolt, a T-bolt having its shank inserted through said aperture and provided with a T-head portion engaging said seat and extending substantially throughout the length thereof, a nut for said bolt engaging said flat lug, and a pad extending throughout the length of said yoke and projecting through said opening in said body portion into engagement with said tool.

2. A chuck comprising in combination, a chuck-body provided with a tool socket and an elongated opening extending from the periphery of said body to said socket, said body having on one side a laterally disposed lug provided with a rounded engaging portion and on the other side a flat lug, a tool seated in said socket, a yoke provided with a recess pad-seat of greater width than said elongated opening, said yoke also having a lip portion overlapping said rounded engaging portion and being of complemental formation with respect thereto, said yoke also being provided with a concave bolt head seat extending throughout its length and apertured to receive the shank of a bolt, a T-bolt having its shank inserted through said aperture and provided with a T-head portion engaging said seat and extending substantially throughout the length thereof, a nut for said bolt engaging said flat lug, and a pad extending throughout the length of said yoke and projecting through said opening in said body portion into engagement with said tool, said pad having lateral extensions or shoulders adapted to seat in said pad-seat and serving to prevent insertion of said pad through said elongated opening beyond a predetermined point.

3. A chuck comprising in combination, a chuck body provided with a tool socket and an opening extending from the periphery of said body to said socket, said body having on one side a laterally disposed lug provided with an engaging portion and on the other side a flat lug, a tool seated in said socket, a yoke having a lip portion overlapping said engaging portion and also provided with a bolt head seat, a bolt provided with a T-head portion engaging said seat, a nut for said bolt engaging said flat lug, and a pad projecting through said opening into engagement with said tool.

4. A chuck comprising in combination, a chuck body provided with a tool socket and an elongated opening extending from the periphery of said body to said socket, said body having on one side a laterally disposed lug provided with a rounded engaging portion, a tool seated in said socket, a yoke provided with a recessed pad seat of greater width than said elongated portion, said yoke also having a lip portion overlapping said rounded engaging portion and being of complemental formation with respect thereto, a pad extending throughout the length of said yoke and projecting through said opening in said body portion into engagement with said tool, said pad having lateral extensions or shoulders adapted to seat in said pad seat and serving to prevent insertion of said pad through said elongated opening beyond a predetermined point, and means engaging said yoke and body to force said pad into engagement with said tool.

In testimony whereof I affix my signature in presence of two witnesses.

WILHELM MAUSS.

Witnesses:
ALFRED L. SPOOR,
WESLEY E. JOHN.